United States Patent Office
3,418,364
Patented Dec. 24, 1968

3,418,364
PESTICIDES
Victor Mark, Norristown, Pa., assignor to Monsanto
Company, a corporation of Delaware
No Drawing. Continuation-in-part of applications Ser. No.
132,570, Aug. 21, 1961, and Ser. No. 44,890, July 25,
1960. This application Dec. 11, 1963, Ser. No. 329,914
20 Claims. (Cl. 260—468)

ABSTRACT OF THE DISCLOSURE

Compounds formed by the reaction of substituted cyclopentadienes and a dienophile of the formula

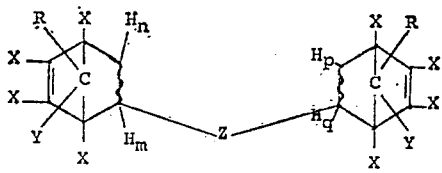

wherein R is selected from the group consisting of alkyl, alkenyl, oxaalkyl and chloroalkyl having an alpha carbon free of chlorine, each of which has up to eight carbon atoms; X is chlorine or bromine; Y is chlorine, bromine or R; ∼ is a single or double carbon-carbon bond; n and p are each integers having the values 1 or 2 and m and q are each integers having the values zero and one, the values being dependent upon whether the hydrogen is attached to a single or double bonded carbon; and Z is selected from the group consisting of phenylene,

alkylene having up to eight carbon atoms, —O—, —S—, —OC—,

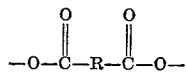

wherein R is an alkylene having up to eight carbon atoms,

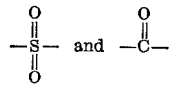

These compounds have insecticidal properties and low mammalian toxicity.

---

This application is a continuation-in-part of Ser. No. 132,570 filed Aug. 21, 1961, now abandoned, which in turn is a continuation-in-part of Ser. No. 44,890.

This invention relates to new chemical compounds and to method of their synthesis. More specifically, the invention is directed to new Diels-Alder type adducts of unusual value. The preparation involves the adduction of substituted halocyclopentadienes and certain types of olefins.

It is well known that hexachlorocyclopentadiene can be reacted with olefins to form adducts which are toxic to living organisms. Although many of these are very toxic to most insects, they are dangerous to use because of their mammalian toxicity. In the use of these compounds, insect toxicity is frequently sacrificed in favor of safety to operating personnel.

It is a fundamental purpose of this invention to provide new biological toxicants with greatly reduced mammalian toxicity, but without serious loss of toxicity to microorganisms. A further purpose is to make available active insecticides, fungicides and herbicides which are relatively safe to use. Other purposes will be apparent from the following description of the preparation and use of the new biologically active compounds.

In copending applications, Ser. No. 44,890 filed July 25, 1960 and Ser. No. 132,570 filed Aug. 21, 1961, by Victor Mark, of which this is a continuation-in-part, there is described a family of halocyclopentadienes which have one or more organic radicals substituted on the cyclopentadiene ring at least one of which is in the allylic position (i.e. on the carbon atom which is not involved in an unsaturated bond). The novel method by which the new compounds are prepared is also claimed therein. These compounds are used in the practice of the present invention and are in accordance therewith adducted to olefins having certain structural configurations.

It is well known that the Diels-Alder adduction involves the reaction of a diene with an unsaturated compound. It is further known that hexachlorocyclopentadienes react in this manner with a wide variety of unsaturated compounds. In accordance with the present invention it has been found that compounds of quite different and valuable properties are prepared by the use of the substituted hexahalocyclopentadienes described in the earlier filed application.

These reactants are represented by the structural formula

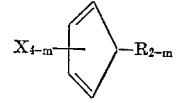

wherein the X's represent halogen atoms of the group consisting of chlorine, bromine, fluorine and iodine; subscript m being an integer from zero (0) to one (1); and wherein each R is a radical selected from the class consisting of hydrocarbon radicals having up to 20 carbon atoms selected from the group consisting of alkyl radicals, such as methyl, ethyl, n-propyl, isopropyl, butyl, isobutyl, sec-butyl, tert-butyl, hexyl, 2-ethylhexyl, decyl, dodecyl and octadecyl radicals;

alkenyl radicals, such as vinyl, allyl, methallyl, crotyl, 2-hexenyl, 10-undecenyl and 2-hexadecenyl radicals;

the alkynyl radicals, such as ethynyl, propargyl, 2-butynyl, 8-decynyl and 2-octadecynyl radicals;

the cycloalkyl radicals, such as cyclopropyl, cyclobutyl, cyclopentyl, cyclohexyl, cyclooctyl, norbornyl, tricyclo [2,21,0²,⁶]-hept-3-yl and cyclo-propylmethyl radicals;

the cycloalkenyl radicals, such as 3-cyclopentenyl, 2-cyclohexenyl, 2-cycloheptenyl, cyclooctenyl, 2-norbornen-5-yl, and nopyl radicals;

the aryl radicals, such as phenyl, biphenylyl, naphthyl, triphenylmethyl and anthracyl radicals;

the alkaryl radicals, such as p-tolyl, 2,4-dimethylphenyl, 7-methyl-1-naphthyl, p-ethylbiphenylyl and 10-ethyl-9-anthracyl radicals;

the alkenaryl radicals, such as p-allylphenyl, m-methyllylphenyl, p-hexadecenylphenyl and the corresponding substituted naphthyl and biphenyl radicals;

the alkyl substituted cycloalkyl radicals, such as 4-dodecylcyclohexyl and the 2-ethylcyclopentyl radicals;

the alkenyl substituted cycloalkyl radicals, such as 2-allylcyclopentyl;

the alkynyl substituted cycloalkyl radicals such as 4-propargylcyclohexyl, ethynylcyclopentyl;

the alkyl cycloalkenyl radicals, such as 3-ethyl-2-cycloheptenyl;

the alkenylcycloalkenyl radicals, such as 4-allyl-2-cyclohexenyl and 4-vinyl-2-cyclohexenyl;

the alkynylcycloalkenyl radicals, such as 4-propargyl-2-cyclohexenyl;

the aralkyl radicals such as benzyl, 2-phenethyl and indenyl radicals;
the aralkenyl radicals, such as cinnamyl and styryl radicals;
the aralkynyl radicals, such as 3-phenylpropargyl;
the cycloalkyl substituted alkyl, such as 3-cyclohexylpropyl;
the cycloalkyl substituted alkenyl radicals, such as 3-cycloheptylallyl, and 3-cyclopentylmethallyl radicals;
the cycloalkyl substituted alkynyl radicals, such as 3-cyclooctylpropargyl and 10-cyclohexyldecynyl radicals;
the cycloalkenylalkyl radicals, such as 2(2-cyclopentenyl)ethyl and 2(1-cyclohexenyl)methyl;
the cycloalkenyl substituted alkenyl radicals, such as 4(1-cyclopentenyl)-2-butenyl and the 2(1-cyclohexenyl)-vinyl radicals;
the cycloalkenyl substituted alkynyl radicals, such as the 3(2-cyclohexenyl)propargyl radical;
the alkyl substituted aralkyl radicals, such as p-ethylbenzyl;
the alkenyl substituted aralkyl radicals, such as p-allylphenethyl;
the alkynyl substituted aralkyl radicals, such as 10(p-propargylphenyl)decyl;
the alkyl substituted aralkenyl radicals, such as 2,4-dimethylcinnamyl;
the alkenyl substituted aralkenyl radicals such as the p-allylstyryl radicals;
and the said hydrocarbon radicals containing substituents of the group consisting of chlorine, as in 2-chloroethyl and p-chlorobenzyl;
bromine, as in 4-bromobutyl;
fluorine, as in 2,2,2-trifluoroethyl;
iodine, such as in 2,4,6-tri-iodobenzyl;
alkoxy, such as in 2-methoxyethyl and p-isopropoxybenzyl;
aryloxy, such as in 2-phenoxyethyl and p-methoxybenzyl;
nitro, such as in o-nitrobenzyl;
cyano, such as in 2-cyanoethyl;
thiocyano, such as in 3-thiocyanoallyl;
isocyano, such as in m-isocyanophenyl;
mercapto, such as in p-mercaptobenzyl;
hydroxyl, such as in 3-hydroxypropyl;
acyloxy, such as o-acetyloxybenzyl;
isothiocyano, such as in 2-isothiocyanoethyl;
acyl, such as in p-acetylphenyl;
hydrocarbonoxy carbonyl, such as the methyl ester of p-carboxybenzyl;
the alkylthio, such as 2-methylthiopropyl;
arylthio, such as in phenylthiomethyl;
aralkylthio, such as in 2-benzylthioethyl;
amino, such as in 2-aminoethyl;
hydrocarbon amino, such as in 2-dimethylaminoethyl;
hydrocarbon sulfonyl, such as in 2-isopropylsulfonylethyl;
hydrocarbon sulfinyl, such as in 2-phenylsulfinylethyl;
furyl, such as in furfuryl;
thienyl, such as in thenyl;
pyridyl, such as in 2-pyridylethyl;
piperidyl, such as in 4-piperidyl;
glycidyl, such as in glycidyl and glycidylmethyl;
morpholyl, such as in 2(2-morpholyl)ethyl;
tetrahydrofuryl, such as in tetrahydrofurfuryl;
dihydrofuryl, such as dihydrofurfuryl;
tetrahydrothienyl, such as tetrahydrothenyl;
dihydrothenyl, such as in dihydrothenyl;
the hydrocarbon and acyl groups of the said substituents having up to 20 carbon atoms.

This invention involves the adduction of the above identified polyhalocyclopentadienes with organic compounds containing carbon to carbon unsaturated bonds, hereinafter designated as the dienophiles, said polyhalocyclopentadienes having at least one organic radical on the allylic carbon atom (one that is not involved in a carbon to carbon double bond). The halogen substituents on the polyhalocyclopentadiene may be chlorine, bromine, fluorine, or iodine and may be the same or different halogen atoms on the cyclopentadiene molecule.

The conditions of reaction between the described cyclopentadienes and the dienophiles are dependent upon the nature and relative reactivity of the reactants. The reaction may be conducted at room temperature and atmospheric pressures, but a wide range of conditions are practicable, usually higher than room temperatures and often higher than atmospheric pressures are required with most reactants.

When the dienophile is very reactive, the simple mixing of the reactants at or below room temperature initiates the reaction. Cooling is then necessary to keep the reactants in liquid form and within the temperature range desired for optimum conversion. It is convenient often to confine the reaction mixture in a closed system to prevent the escape of the volatile component. The use of closed vessels (autoclaves) is especially desirable when the dienophile is gaseous at room temperature. Furthermore, when the reaction partners do not readily interact, the application of heating may be desirable to increase the rate of adduction; this often is done in autoclaves and under autogenous pressures.

The reaction often is conducted in the presence of appropriate solvents. These may have multiple beneficial effects. For instance, a liquid with good solvent properties for the less soluble component might increase the effective concentration, and the rate of the reaction. A liquid often is used when an internal coolant is needed to keep the temperature within a narrow range. By choosing a liquid with a boiling point close to the temperature required for the reaction, the danger of overheating is greatly reduced because the refluxing liquid dissipates the heat of the reaction. Suitable inert solvents are hydrocarbons (benzene, toluene), ethers, halogenated solvents (chlorobenzene) and the like.

The use of catalysts is often desirable in order to speed up the rate of conversion of sluggish reactants. Lewis acids, such as those used in the Friedel-Crafts reaction, are especially useful catalysts. These include $AlCl_3$, $BF_3$, $SbCl_3$, $FeCl_3$, etc.

Further details in the preparation and use of the new compounds are set forth hereinafter in specific examples.

The reaction between two moles of the organic substituted halocyclopentadiene and one mole of a poly unsaturated dienophile will produce compounds of the structure.

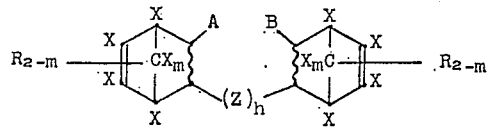

wherein $h$ is an integer from zero (0) to one (1) and wherein Z is a divalent aliphatic hydrocarbon of up to eight carbon atoms.

Suitable dienophiles for effecting this reaction are divinyl amine, diallyl amine, vinyl allyl amine, divinyl benzene, diallyl benzene, diethynye benzene, vinyl allyl benzene, diallyl phosphate, divinyl phosphate, butadiene, vinyl acetylene, diacetylene (butadiyne), 1,5-hexadiene, 1,9-decadiene, divinyl sulfone, diallyl sulfone, vinyl allyl sulfone, the corresponding sulfides and sulfines, diethynyl sulfide, dipropargyl sulfide, vinyl acrylate, allyl acrylate, ethynyl acrylate, crotonates, etc.; diallyl, diethynyl dipropargyl and divinyl esters of dicarboxylic acids, such as succinic acid, oxalic acid, adipic acid, and other unsaturated dicarboxylic acids, diphenyl ether, diallyl, diethynyl dipropargyl and mixed vinyl allyl ethers, and the unsaturated carbamates.

The preferred class of the new compounds is that of the structure:

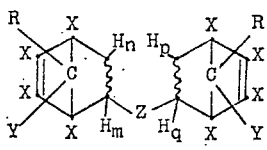

wherein the R radical is selected from the class consisting of alkyl radicals having up to eight carbon atoms, the alkenyl radicals of up to eight carbon atoms, the oxaalkyl radicals of uu to eight carbon atoms, and the chloroalkyl radicals having up to eight carbon atoms and free of chlorine on the alpha carbon atom; wherein X is selected from the class consisting of chlorine and bromine; wherein Y is selected from the class consisting of X and R radicals; wherein $n$ and $p$ are integers from one to two and $m$ and $q$ are integers from zero to one; wherein the symbol ~ is an atomic bond selected from the group consisting of single carbon to carbon bonds and unsaturated carbon to carbon double bonds; and wherein Z is selected from the group consisting of a single valence bond and divalent radicals of the class consisting of phenylene, —NH—, alkylene of up to eight carbon atoms,

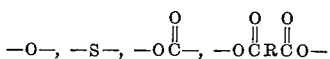

wherein R is an alkylene of up to eight carbon atoms,

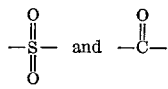

Further details of the compounds and methods for their preparation are set forth in the following examples.

EXAMPLE 1

Two molar proportions of 5-allyl-1,2,3,4,5-pentachlorocyclopentadiene with one mol of p-divinylbenzene were adducted by mixing the reactants and then heating to complete the reaction. The resulting product had the structure

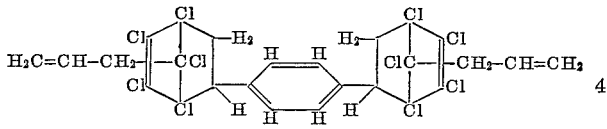

EXAMPLE 2

A flask was charged with 5(2-ethylhexyl)-1,2,3,4,5-pentachlorocyclopentadiene. A half molar proportion of butadiene was added gradually through a tube with the end immersed in the reaction mixture. The resulting product was principally a compound of the structure

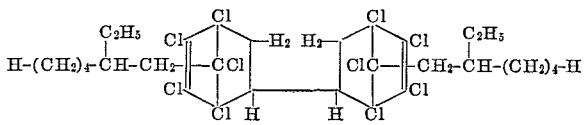

EXAMPLE 3

One mol of divinyl amine and two molar proportions of 1,2,3,4,5-pentachloro-5-(2-chloroethyl)cyclopentadiene were heated at reflux temperature. The product was found to have the structure

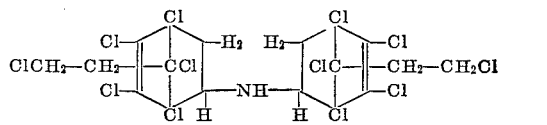

EXAMPLE 4

Two mols of 1,2,3,4,5-pentachloro-5-(3-ethoxypropyl)-cyclopentadiene were gradually combined with diacetylene (butadiyne). The reaction induced an adduction to yield the product

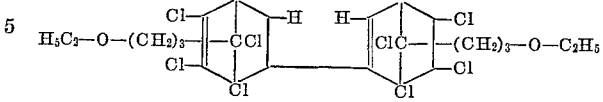

EXAMPLE 5

The adduction of two mols of 1,2,3,4-tetrachloro-5,5-dimethylcyclopentadiene and one mol of 1,5-hexadiene produced a compound of the structure

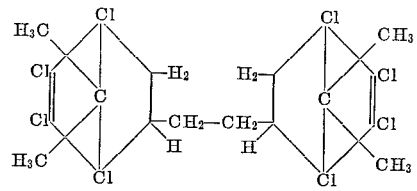

EXAMPLE 6

One mol of vinyl acetylene was gradually added to two mols of 1,2,3,4,5-pentachloro-5-ethylcyclopentadiene and heated at 160° C. to effect a complete reaction. The product was identified as that having the structure

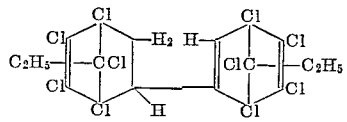

EXAMPLE 7

The Diels-Alder adducts are prepared from vinyl propiolate and 1,2,3,4-pentachloro-5-(n-propyl)cyclopentadiene to form the compound of the structure

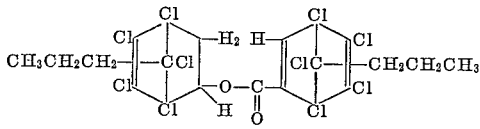

EXAMPLE 8

1,2,3,4,5 - pentachloro - 5 - methylcyclopentadiene was adducted with diallyl succinate by heating two mols of the pentadiene with one mol of the ester at a temperature of about 200° C. The product was identified as

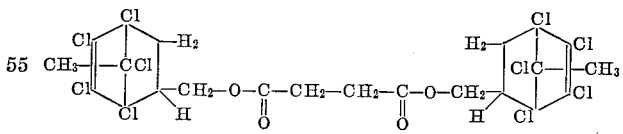

EXAMPLE 9

The adduct of divinyl ether and 1,2,3,4,5-pentachloro-5-ethylcyclopentadiene was prepared by bubbling the divinyl ether through two molecular equivalents of the substituted cyclopentadiene. The product was a compound of the structure

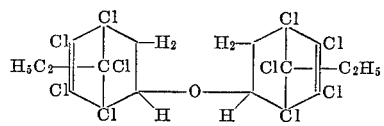

EXAMPLE 10

The adduct of vinyl allyl sulfone and 1,2,3,4-tetrabromo - 5,5 - dimethylcyclopentadiene was prepared by a procedure analogous to that of Example 8 to synthesize a compound of the structure

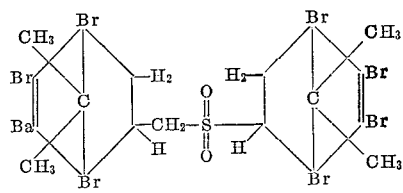

EXAMPLE 11

The adduct of diallyl ketone and 1,2,3,4,5-pentachloro-5 - (2 - chloroethyl)cyclopentadiene was prepared by the method of Example 4. The resulting product had the structure

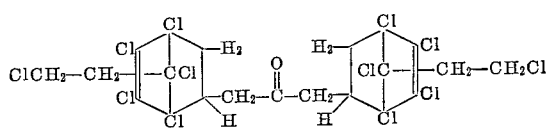

EXAMPLE 12

The adduct of diethynyl sulfide and 1,2,3,4,5-pentachloro - 5 - [2(n-butoxy)ethyl]cyclopentadiene was prepared by the procedure of Example 4. The resulting product had the structure

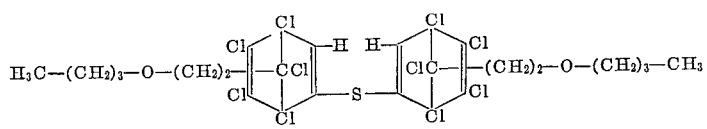

The above examples represent preferred modifications of the invention and these will suggest further variations to one skilled in the art. Similarly, the following claims are directed to more useful modifications of the invention, but other compounds of the claims defined broadly will have similar utility.

What is claimed is:

1. A compound of the structure

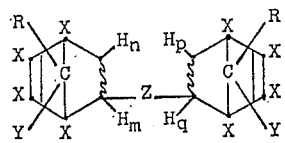

wherein the R radical is selected from the class consisting of alkyl radicals having up to eight carbon atoms, the alkenyl radicals of up to eight carbon atoms, the oxaalkyl radicals of up to eight carbon atoms, and the chloroalkyl radicals having up to eight carbon atoms and free of chlorine on the alpha carbon atom; wherein X is selected from the class consisting of chlorine and bromine; wherein Y is selected from the class consisting of X and R radicals; wherein $n$ and $p$ are integers from one to two and $m$ and $q$ are integers from zero to one; wherein the symbol $\sim$ is an atomic bond selected from the group consisting of carbon to carbon single bonds and unsaturated carbon to carbon double bonds; and wherein Z is selected from the group consisting of a single valence bond and divalent radicals of the class consisting of phenylene, —NH—, alkylene of up to eight carbon atoms,

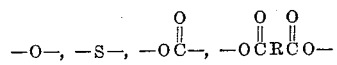

wherein R is an alkylene of up to eight carbon atoms,

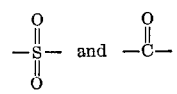

2. A compound of the structure

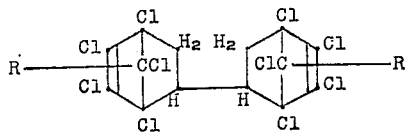

wherein R is an alkyl radical of up to eight carbon atoms.

3. A compound of the structure

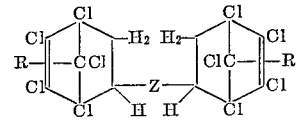

wherein Z is oxygen or sulfur and R is an alkyl radical of up to eight carbon atoms.

4. A compound of the structure

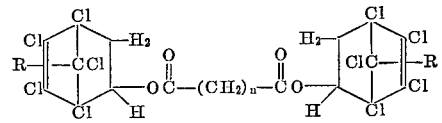

wherein $n$ is an integer from zero to eight, and wherein R is an alkyl radical of up to eight carbon atoms.

5. A compound of the structure

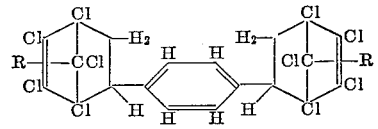

wherein R is an alkyl radical of up to eight carbon atoms.

6. A compound of the structure

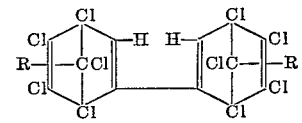

wherein R is an alkyl radical of up to eight carbon atoms.

7. A compound of the structure

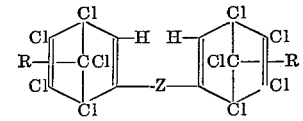

wherein Z is oxygen or sulfur and R is an alkyl radical of up to eight carbon atoms.

8. A compound of the structure

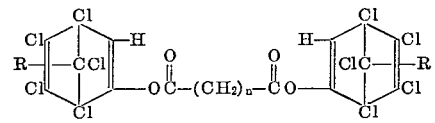

wherein $n$ is an interger from zero to eight, and wherein R is an alkyl radical of up to eight carbon atoms.

9. A compound of the structure

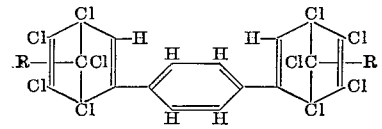

wherein R is an alkyl radical of up to eight carbon atoms.

10. A compound of the structure

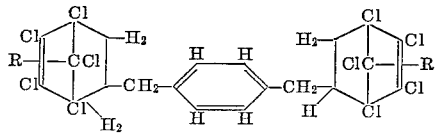

wherein R is an alkyl radical of up to eight carbon atoms.

11. A compound of the structure

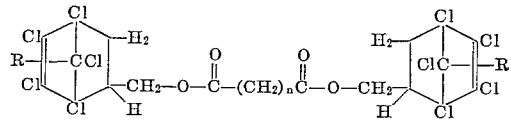

wherein n is an integer from zero to eight and wherein R is an alkyl radical of up to eight carbon atoms.

12. A compound of the structure

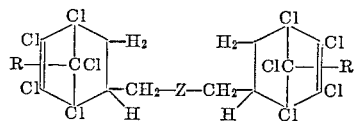

wherein Z is oxygen or sulfur and R is an alkyl radical of up to eight carbon atoms.

13. A compound of the structure

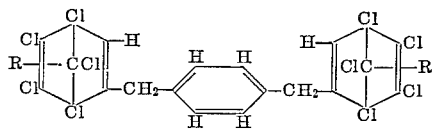

wherein R is an alkyl radical of up to eight carbon atoms.

14. A compound of the structure

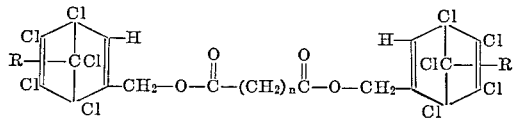

wherein n is an integer from zero to eight and wherein R is an alkyl radical of up to eight carbon atoms.

15. A compound of the structure

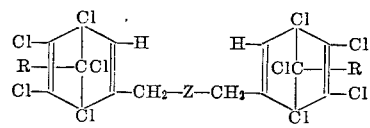

wherein Z is oxygen or sulfur and R is an alkyl radical of up to eight carbon atoms.

16. An adduct of 1,2,3,4,5-pentachloro-5-allylcyclopentadiene and divinyl benzene of the structure

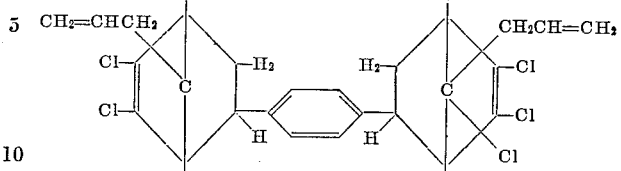

17. An adduct of 1,2,3,4,5-pentachloro - 5 - (2 - ethylhexyl)-cyclopentadiene and butadiene of the formula

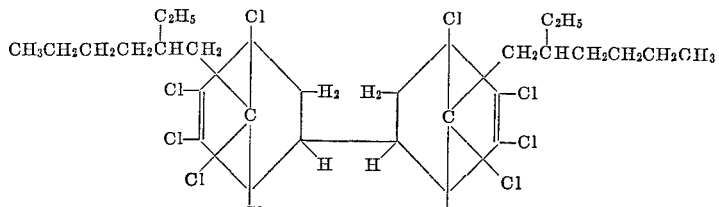

18. An adduct of 1,2,3,4,5-pentachloro-5-methylcyclopentadiene and diallyl succinate of the formula

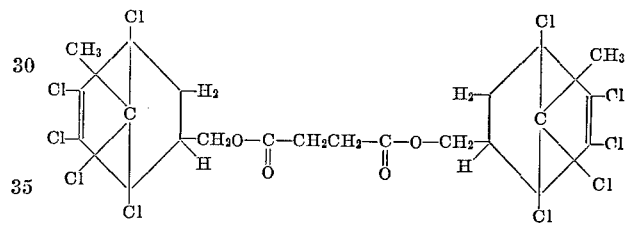

19. An adduct of 1,2,3,4,5-pentachloro - 5 - ethylcyclopentadiene and divinyl ether of the formula

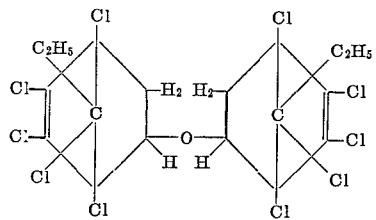

20. An adduct of 1,2,3,4,5-pentachloro-5-propylcyclopentadiene and ethynl acrylate of the formula

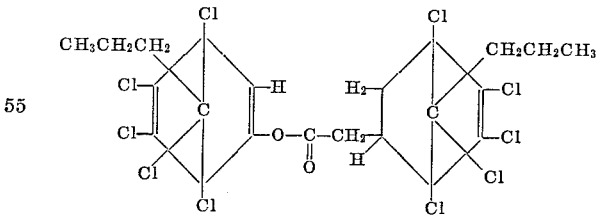

References Cited

UNITED STATES PATENTS

| | | | |
|---|---|---|---|
| 2,606,910 | 8/1952 | Herzfeld et al. | 260—648 |
| 2,952,711 | 9/1960 | Roberts | 260—649 |
| 3,215,744 | 11/1965 | Luvisi | 260—648 |

FOREIGN PATENTS 913,929   12/1962   Great Britain.

LORRAINE A. WEINBERGER, *Primary Examiner.*
T. GALLOWAY, *Assistant Examiner.*

U.S. Cl. X.R.

260—648, 649, 607, 609, 485, 611, 563, 586, 644, 464, 346.1, 332.5, 290, 293, 247; 167—30; 71—98, 103, 106, 121, 123, 124, 125, 126